United States Patent [19]
Rogerson

[11] Patent Number: 5,454,586
[45] Date of Patent: Oct. 3, 1995

[54] DRIVER SIDE AIR BAG MODULE WITH EXTRUDED HOUSING

[75] Inventor: William Rogerson, Rochester Hills, Mich.

[73] Assignee: AlliedSignal Inc., Morristown, N.J.

[21] Appl. No.: 163,243

[22] Filed: Dec. 6, 1993

[51] Int. Cl.⁶ .............................. B60R 21/20; B60R 21/26
[52] U.S. Cl. ...................... 280/728.2; 280/736; 280/740; 280/728.3
[58] Field of Search .................. 280/728 A, 728 B, 280/731, 732, 736, 737, 740, 741, 743 R, 728 R

[56] References Cited

U.S. PATENT DOCUMENTS

| | | | |
|---|---|---|---|
| 3,877,721 | 4/1975 | Brown, Jr. | 280/736 |
| 4,153,273 | 5/1979 | Risko | 280/728 A |
| 4,842,300 | 6/1989 | Ziomek et al. | 280/732 |
| 4,941,678 | 7/1990 | Lauritzen et al. | 280/728 B |
| 5,005,860 | 4/1991 | Mori et al. | 280/731 |
| 5,087,067 | 2/1992 | Seki et al. | 280/728 A |
| 5,088,764 | 2/1992 | Augustitus et al. | 280/731 |
| 5,209,519 | 5/1993 | Shiga et al. | 280/728 A |
| 5,263,739 | 11/1993 | Webber et al. | 280/732 |
| 5,275,432 | 1/1994 | Pray et al. | 280/728 A |
| 5,332,256 | 7/1994 | Lauritzen et al. | 280/728 A |
| 5,348,339 | 9/1994 | Turner | 280/728 B |

FOREIGN PATENT DOCUMENTS

| | | | |
|---|---|---|---|
| 0558240 | 9/1993 | European Pat. Off. | 280/728 A |
| 5077683 | 3/1993 | Japan | 280/728 B |

Primary Examiner—Karin L. Tyson
Assistant Examiner—Peter C. English
Attorney, Agent, or Firm—Markell Seitzman

[57] ABSTRACT

An air bag module (10) comprising: an extruded housing (12) having first and second side walls (24, 26) and ends (72, 74), and a bottom (23) linking the side walls, an integral hollow manifold (14) formed as an extending part of the first side wall (24), the manifold including a plurality of openings (18) therethrough, a first slot (32) formed as an integral part of the first side wall (24) proximate its top, a first notch (34) formed on an outside surface of the side wall (24) and a first rotatable flange (50) on the first side wall (24) movable toward the first notch (34), a first groove (52) formed between the first flange (50) and the outside surface of the first side wall, the second side wall (26) including a boss (60) at its top and a second slot (33) integrally formed therewith proximate the bottom (23), a wall portion (62) spaced from the second side wall (26) forms a second groove (66) therebetween, end plates (80a, 80b), each having an opening aligned with a hollowed portion (90) of the manifold for mating upon opposite ends of the housing, a cylindrical inflator and ring nut compressively load the end plates against the housing and an air bag (250) is located within the housing and a cover (160) protects the air bag.

6 Claims, 2 Drawing Sheets

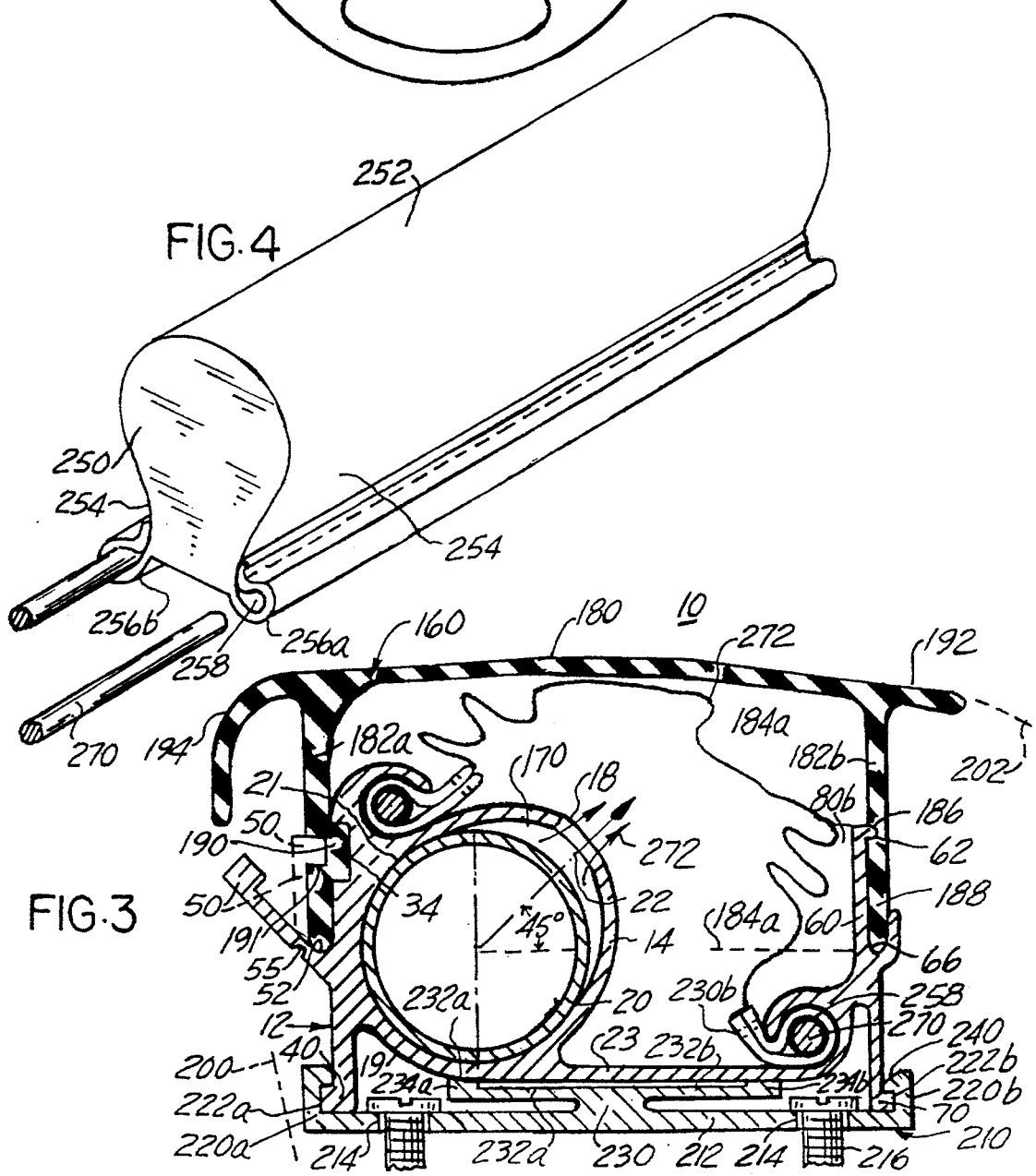

DRIVER SIDE AIR BAG MODULE WITH EXTRUDED HOUSING

BACKGROUND AND SUMMARY OF THE INVENTION

The present invention generally relates to air bag modules for automotive vehicles.

Driver side air bag modules typically include a circular cylindrically shaped inflator, which is attached to the hub of a steering wheel and an air bag and cover are placed about the inflator. One such driver side module is shown in U.S. Pat. No. 3,819,203.

It is an object of the present invention to provide an improved air bag module for use on the driver side of this vehicle. A further object of the present invention, is to provide a module having an extruded housing and one in which the air bag and protective cover may be attached to the housing without the use of conventional fasteners. A further object of the invention is to provide a module having a housing for receipt of a cylindrically shaped hybrid inflator. Accordingly the invention comprises an air bag module comprising: an extruded housing having first and second side walls and ends, and a bottom linking the side walls, an integral hollow manifold formed as an extending part of one of the first side wall the manifold including a plurality of openings therethrough, a first slot is formed as an integral part of the first side wall proximate its top, a first notch is formed on an outside surface of the first side wall and a first rotatable flange is formed on the first side wall movable toward the groove. A first groove is formed between the first flange and the outside surface of the first side wall. The second side wall includes a boss at its top and a second slot is integrally formed therewith proximate the bottom of the housing. A wall portion is spaced from the first side wall forming a second groove therebetween and end plates each having an opening aligned with a hollowed portion of the manifold mate upon the ends of the housing. The module further includes a cylindrically shaped inflator for providing inflation gas to inflate an air bag mounted within the housing. The inflator includes a first narrow portion having at least one gas exit opening thereon. The tip of the first end is threaded. The inflator further includes a second portion having a flanged end. The inflator extends through the openings in the end plates and through the hollow manifold and a ring nut threadably engages the threads on the inflator and the inflator flange and ring nut compressively load the end plates against the housing.

Many other objects and purposes of the invention will be clear from the following detailed description of the drawings.

BRIEF DESCRIPTION OF THE DRAWINGS

In the drawings:

FIG. 2 illustrates a plan view of a steering wheel showing the general position of an air bag module thereon.

FIG. 3 illustrates a cross sectional view through section lines 3—3 of FIG. 1 and additionally shows a cover and air bag fitted to a housing.

FIG. 4 schematically represents an air bag for use in the present invention.

DETAILED DESCRIPTION OF THE DRAWINGS

Figure 1:
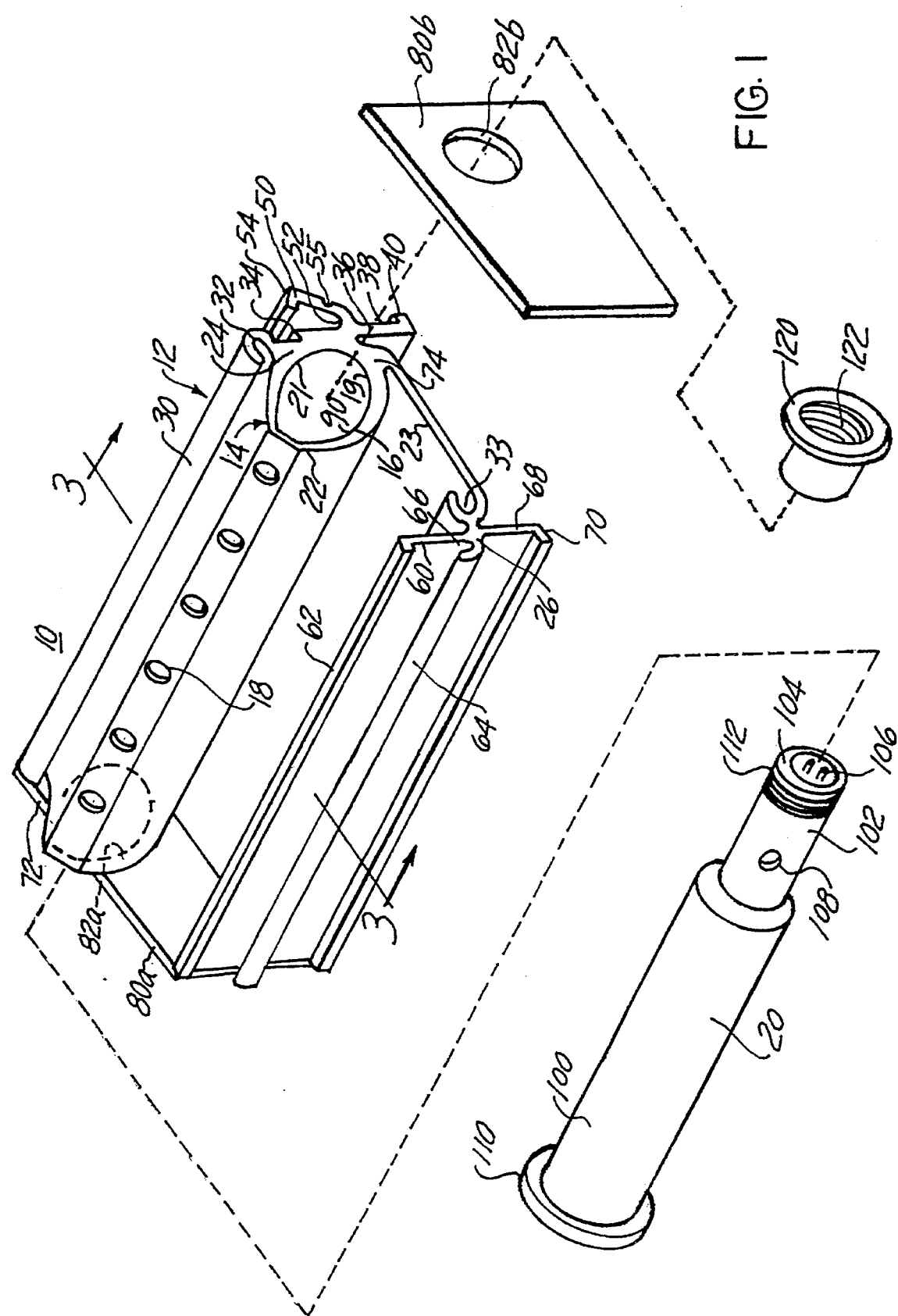
FIG. 1 is an orthogonal view showing the major components of the present invention.

With reference to FIG. 1 there is shown an orthogonal view of the major components of a driver side air bag module 10. The module 10 includes an extruded rectangular shaped housing generally shown as 12. The housing may be formed of aluminum, magnesium, or a structural plastic such as caprolactan. The housing includes a hollow cylindrical part or manifold 14 which is circular from points 16 to 19 to 21 and oblong or oval shape from points 16 to 22 to 21. Positioned across the cylindrical part 14 are a plurality of openings 18 which extend through the wall of the cylindrical part. These openings are generally located at an angle of about 45° from the horizontal and extend across the length of the cylindrical part or manifold. These openings 18 are used to communicate inflation gas from an inflator 20 to an air bag (shown in FIG. 3). Positioned below the cylindrical part or manifold 14 of the housing 10 is an integrally formed bottom 23. The module further includes side walls 24 and 26. The top portion of the side wall 24 is arcuately shaped at 30 to form an integral groove or slot 32, open along a side thereof, which extends the length of the housing 12. Side wall 26 includes another integrally formed open groove or slot 33 near bottom 23. An axially extending slot 34 or notch 34 is formed across the outer surface of side wall 24. The lower portion of side wall 24, generally at 36, extends downwardly forming a support leg 38 having a flange or shoulder 40. Extending outwardly from side wall 24 is another integrally formed flange 50. The lower portion of flange 50, in combination With side wall 24, forms a pocket or groove 52. The top portion of flange 50 includes a boss or shoulder 54 which also runs the length of the housing. The flange 50 includes a stress riser 55 extending the length of the flange 50 which defines a thin or compliant region of the flange 50. As will be seen from the description below, the stress riser 55 enables the flange 50 to be moved inwardly toward the groove 34.

The side wall 26 includes a narrow upwardly extending wall portion 60 having formed at its top, an outwardly extending boss 62. Positioned opposite wall portion 60 of side wall 26 is a spaced wall portion 64. The spacing between wall portions 60 and 64 defines a groove 66. The lower portion of side wall 26 includes a downwardly extending member 68. The bottom of member 68 includes an outwardly extending boss or shoulder 70.

The ends 72 and 74 of the housing 12 are generally formed or cut parallel to one another. The ends of housing 12 are enclosed by end plates 80a and 80b. The end plates 80a, and 80b may be formed of the same or similar material as that used in the extruded housing. Each end plate includes a circular opening 82a, and 82b respectively. When the end plates are in place on the housing 12, the openings 82a and 82b are in general alignment with the hollow portion 90 of the cylindrical part or manifold 14.

As mentioned above, FIG. 1 also shows an inflator 20. In the preferred embodiment of the invention, this inflator is a hybrid inflator that provides stored gas, either at ambient temperature or heated to inflate the air bag. The inflator 20 includes a large diameter cylindrical part 100 in which is stored inflation gas such as Argon. This portion of the inflator is a pressure vessel. The inflator 20 includes a narrow diameter part 102 in which is placed a quantity of burnable propellant and an ignitor which when activated causes a frangible disk to break permitting the Argon gas to enter and inflate an air bag. The frangible disc closes one end of the gas storing part or pressure vessel, of the hybrid inflator and separates it from the propellant. The inflator may also include a mechanism used to rupture the frangible disc. One such hybrid inflator having a pressure vessel for storing the Argon gas, a frangible disc and a movable piston used to rupture the disc, propellant and ignitor used to ignite the propellant is shown in U.S. Pat. No. 5,257,819 which is incorporated herein by reference. Schematically shown at end 104 of the inflator are a plurality of electrical terminals 106 that receive a control signal communicated thereto to activate the ignitor causing the burning of the propellant. The inflation gas exits the hybrid inflator through typically two oppositely positioned gas exit openings 108. Only one of these openings 108 is shown in FIG. 1. The other one of these openings is positioned on the other side of portion 102 opposite the location of opening 108. The inflator 20 shown in FIG. 1 further includes a circular flange 110. The inflator 20, at the end of the narrow portion 102 includes screw threads 112.

With plate 80a inserted on end 72, the inflator 20 is inserted within opening 82a of the plate 80a, with the flange 110 resting upon the plate 80a about opening 82a. With the inflator 20 in place, the right hand threaded end of portion 102 will come to rest slightly beyond the plane of the side plate 80b of the housing 12. Plate 80b is positioned upon end 74 and a threaded, hollow ring nut 120 having internal threads 122 is inserted through opening 82b and threadably attached to the threads 112 of the inflator 20. As can be appreciated, the inflator 20 in addition to supplying the inflation gas also functions as a structural member maintaining the plates 80a and 80b together by virtue of the compressive forces generated between the flange 110 and the ring nut 120 and assists in preventing the deformation of housing, typically called "bell mouthing" which results upon inflation of the air bag.

With reference to FIG. 2 there is shown a plan view of a typical steering wheel 150 having a center or hub portion 152. The housing 12 is positioned in the steering wheel and is represented by the rectangle 154 which shows the general location of the housing 12. The dotted line surrounding housing 12 shows the location of the edges 156 of a cover 160 secured to the housing. Various other trim or decorative portions of steering wheel, generally shown as 158, provide meeting surfaces adjacent to the edges 156 of the cover 160 to provide a smooth transitional surface across the face of the steering wheel.

Reference is made to the cross sectional view shown FIG. 3. The relative orientation of the inflator 20 to the hollow cylinder 14 can be seen. As Section 3—3 cuts across the wide diameter portion of the cylindrical inflator 20 only a relatively small space 170 exists between the inflator 20 and the top or oval shaped part of the manifold cylinder 14. This spacing provides a channel through which inflation gases flow from the exit opening 108 across the entire length of the cylinder and exit each of the openings 18. As can be appreciated, the spacing between the narrow portion 102 of the inflator 20 and the cylinder 14 is somewhat greater. Positioned atop the housing 12 is the cover 160 typically made from a moldable material as is known in the art. The cover 160 includes top 180 and side walls 182a and 182b extend down from the top. Also extending down from the top are end walls 184a and 184b (end wall 184b is not shown but is oppositely positioned relative to end wall 184a). The side walls and end walls form a cavity which envelop the housing sides and end plates such as 80a and 80b. Side wall 182b includes a groove 186 into which the bar or boss 62 of the wall portion 60 extends. The end or tip 188 of side wall 182b fits within the groove 66 formed within the side 26 of housing 12. Formed on side wall 182a is an inwardly extending boss 190 that snugly fits within the groove 34 formed on wall 24 of the housing 12. With the cover 160 in position on the housing, the flange 50 is forcibly moved or rotated about the stress riser 55 to the position shown by the dotted line to clamp the cover 160 in place. The top 180 includes an extending bottom flange 192 and a curved top flange 194. When the housing 12 and cover 160 are in place on the steering wheel the curved flange 194 is located on the top of the hub portion 152 of the steering wheel. The dotted line 200 represents a bezel portion of the steering wheel and the dotted line 202 represents another part of the steering wheel which mates with the flange 192 to provide a smooth transition surface thereacross.

The housing 12 is secured to the hub portion 152 of the steering wheel by a mounting bracket or flange 210. In the preferred embodiment of the invention it is envisioned that this mounting flange or bracket 210 is fabricated of an extruded metal but could also be made of machined parts. The mounting flange includes a bottom 212 having a plurality of openings 214 therethrough to receive a like plurality of fasteners 216. The fasteners 216 are received within threaded openings of a support member (not shown) in the steering wheel 150. Extending upwardly from the bottom are side walls 220a and 220b having respective notches 222a and 222b. Extending upwardly from about the middle of the bottom 212 is a riser 230. Extending outwardly from the riser are two thin leaves or plates 232a and 232b. Each plate, near its end, includes an upwardly extending boss 234a and 234b respectively. The plates are fabricated thin enough to permit them to flex relative to the riser. As will be seen from the description below, these plates provide integrally formed mounting springs which assists in securing the housing 12 to the mounting bracket 210 again without the use of additional, conventional fasteners.

During the assembly, the mounting bracket 210 is secured to the steering wheel 150. Thereafter the shoulder 40 of the housing 12 is inserted within the groove or notch 222a of wall 220a thereafter the housing is pushed downwardly into engagement with the bosses 234a and 234b compressing the spring/plates 232a and 232b. During this downwardly motion the shoulder or boss 70 formed on side 26 of the housing 12 engages a ramp surface 240 formed on the mounting bracket. The forces generated therebetween cause the side wall 220b to move slightly outwardly. When the shoulder 70 is in place within groove 222b, the wall 220b snaps back into place securing the housing thereto. The leaves or plates 232a and 232b provide an upward force on the housing 12 keeping it in place.

Prior to attaching the housing 12 to the mounting bracket, the inflator 20, cover 160 and air bag 250 are installed within the housing 12. Reference is briefly made to FIG. 4 which schematically represents an air bag 250. Air bags are typically constructed of a woven fabric and includes a cushion portion 252 to receive the inflation gas and a neck portion generally shown as 254. The sides 256a and 256b of the air bag, proximate the neck portion 254 are sewn together to provide a looped portions of material generally shown as 258. Rods 270 fabricated of plastic or metal are inserted within the looped portions 258. The looped portions 258 with the rods 270 in place are inserted within the slots 32 and 33 formed in the sides of the housing. This orientation is generally shown in FIG. 3. The remaining portions of the bag are folded to fit within the housing, on top of and adjacent the cylindrical manifold 40. The side plates 80a and 80b may or may not be in place on the housing 12 when the air bag is folded. If the plates 80a and 80b are loose they may be held in place relative the housing 12 by a fixture or at least one plate such as 80*a* could be welded in place prior to folding of the air bag. The folded configuration of the air bag 250 is generally shown by numeral 272. Thereafter, the inflator 20 is inserted into the housing 12 to clamp the end plates 80*a* and 80*b* in place in the manner described above by attaching the nut 120.

During a crash of a level severe enough to activate an air bag, a control signal is communicated to the inflator causing same to provide inflation gas to the air bag. The inflation gas flows out from the exit openings 108 and through each of the openings 18. The flow of inflation gas is generally shown by arrow 272 (see FIG. 3). As the air bag begins to inflate, it will press against side 182*b* of the cover causing it to deform outwardly. As this side wall 182*b* deforms outwardly, its notch 186 is disengaged from the boss 62 formed on the housing 12. With the side wall 182*b* disengaged from the housing, the continued inflation of the air bag will cause the cover 160 to rotate about the side wall 182*a* pushing the cover generally away from the driver and providing additional space through which the air bag can inflate.

Many changes and modifications in the above described embodiment of the invention can, of course, be carried out without departing from the scope thereof. Accordingly, that scope is intended to be limited only by the scope of the appended claims.

I claim:

1. An air bag module (10) comprising:

an extruded housing (12) having first and second side walls (24, 26), each side wall having a top, and opposite ends (72,74), and a bottom (23) linking the side walls, an integral hollow manifold (14) formed as an extending part of the first side wall (24), the manifold including a plurality of openings (18) therethrough, a first slot (32) formed as an integral part of the first side wall (24) proximate its top, a first notch (34) formed on an outside surface of the first side wall (24) and a first rotatable flange (50) movably mounted on the first side wall (24) adjacent the first notch (34) and fixedly clamping a part of a cover (160) within the first notch (34), a first groove (52) formed between the first flange (50) and the outside surface of the first side wall, the second side wall (26) including a boss (60) at its top and a second slot(33) integrally formed therewith proximate the bottom (23), the second side wall (26) includes a second groove (66), and end plates (80*a*, 80*b*), each having an opening aligned with a hollowed portion (90) of the manifold, positioned upon the opposite ends of the housing.

2. The module as defined in claim 1 including an inflator (20), having a cylindrically shaped body, for providing inflation gas to inflate an air bag (250) mounted within the housing (12), the inflator (20) including at least one gas exit opening (108) thereon, the body including a first portion having exterior threads (112) thereabout, the inflator (20) including a second portion (100) having a flanged end (110), the inflator (20) extending through the openings (82*a,b*) in the end plates (80*a,b*) and through the hollow manifold (14), fastener means (120), extending through a respective opening in one of the end plates (80*a*, 80*b*), for threadably engaging the exterior threads on the inflator and upon the tightening of the fastener means on the inflator, the inflator flanged end and fastener means compressively load the end plates against the housing (12).

3. An air bag module (10) comprising:

an extruded housing ( 12 ) having first and second side walls (24, 26), each side wall having a top, and opposite ends (72,74), and a bottom (23) linking the side walls, an integral hollow manifold (14) formed as an extending part of the first side wall (24), the manifold including a plurality of openings (18) therethrough, a first slot (32) formed as an integral part of the first side wall (24) proximate its top, a first notch (34) formed on an outside surface of the first side wall (24) and a first rotatable flange (50) on the first side wall (24) movable toward the first notch (34), a first groove (52) formed between the first flange (50) and the outside surface of the first side wall, the second side wall (26) including a boss (60) at its top and a second slot (33) integrally formed therewith proximate the bottom (23), the second side wall (26) includes a second groove (66), and end plates (80*a*, 80*b*), each having an opening aligned with a hollowed portion (90) of the manifold, positioned upon the opposite ends of the housing, including a cover ( 160 ) having first and second sides (182*a,b*) extending from a top (180), an end of the first side (182*a*) being received within the first groove (52) and an end of the second side (182*b*) being received within the second groove (66).

4. The module as defined in claim 3 wherein the first side includes a boss (190) and a second notch (191) behind the boss, the boss (190) inserted within the first notch (34) and the first flange (50) inserted within the second notch (191).

5. The module as defined in claim 4 including an air bag (250) having looped ends (258) formed in side portions thereof, the air bag being stored in a folded configuration within the housing prior to inflation, a rod (270) inserted within each looped end (258) and one rod and looped end received within each of the first and the second slots (32, 33) of the housing.

6. An air bag module (10) comprising:

a folded air bag and an extruded housing having open ended first and second side walls, each side wall having respective ends and a top, the housing further including a substantially flat bottom linking the side walls and, an integral hollow manifold, extending along the first side wall, formed in part from a lower part of the first side wall and an adjacent part of the bottom, the manifold further including an oval section, spaced from the second wall, having a top portion, extending from the lower part of the first side wall and the adjacent part of the bottom, the top portion extending along a plane positioned at an angle of about 45 degrees with the bottom, the top portion including a plurality of openings therethrough, a first slot formed as an integral part of the first side wall proximate its top, with a part of the air bag secured therein, first locking means formed on an outside surface of the first side wall for holding a first part of a cover which encloses the housing, the second side wall including second locking means for securing another part of the cover, a second slot integrally formed proximate the intersection of the bottom and the second side wall another part of the air bag secured therein, end plates, each having an opening aligned with a hollowed portion of the manifold positioned upon the ends of the side walls, wherein part of the folded air bag extends over the openings in the manifold and another part of the folded air bag is positioned in the space between the manifold and the second side wall and covered by the cover.

\* \* \* \* \*